US009330540B2

(12) United States Patent
Michels

(10) Patent No.: US 9,330,540 B2
(45) Date of Patent: May 3, 2016

(54) CUSTOMIZATION APPARATUS AND METHOD

(71) Applicant: Steven R. Michels, Seattle, WA (US)

(72) Inventor: Steven R. Michels, Seattle, WA (US)

( * ) Notice: Subject to any disclaimer, the term of this patent is extended or adjusted under 35 U.S.C. 154(b) by 0 days.

(21) Appl. No.: 14/227,979

(22) Filed: Mar. 27, 2014

(65) Prior Publication Data

US 2014/0213340 A1 Jul. 31, 2014

Related U.S. Application Data

(63) Continuation of application No. PCT/US2012/058059, filed on Sep. 28, 2012, and a continuation-in-part of application No. 13/423,856, filed on Mar. 19, 2012, now abandoned, which is a (Continued)

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/34*** | (2006.01) |

(Continued)

(52) U.S. Cl.
CPC ................ *G07F 17/34* (2013.01); *G07F 13/00* (2013.01); *G07F 17/32* (2013.01); *G07F 17/3211* (2013.01); *G07F 17/3227* (2013.01); *G07F 17/3262* (2013.01)

(58) Field of Classification Search
CPC ......... A63F 13/00; G07F 17/34; G07F 17/32; G07F 17/3211
USPC ................................................ 463/16, 20, 42
See application file for complete search history.

(56) References Cited

U.S. PATENT DOCUMENTS

| | | | | |
|---|---|---|---|---|
| 6,578,847 | B1 | 6/2003 | Hedrick et al. | |
| 2003/0003988 | A1 * | 1/2003 | Walker et al. | 463/21 |
| 2003/0069057 | A1 | 4/2003 | DeFrees-Parrott | |

(Continued)

FOREIGN PATENT DOCUMENTS

| | | |
|---|---|---|
| CN | 101388127 | 3/2009 |
| EA | 9308 | 12/2007 |
| JP | 3425141 | 7/2003 |

OTHER PUBLICATIONS http://urc.sakura.ne.jp/hp/playroom/slot_m/ believed to be available by Nov. 8, 2004, 8 pages, cited in International Search Report and received from ISA on Sep. 14, 2009.

(Continued)

*Primary Examiner* — Omkar Deodhar
*Assistant Examiner* — Wei Lee
(74) *Attorney, Agent, or Firm* — Foley & Lardner LLP

(57) ABSTRACT

Systems for and methods of customizing at least one gaming apparatus is provided. The at least one gaming apparatus is operated as a slot machine game. The system includes a storage unit for storing a plurality of themes. Each of the plurality of themes includes a first set of full-motion videos associated with a first body portion of a plurality of actors, a second set of full-motion videos associated with a second body portion of the plurality of actors, and a third set of full-motion videos associated with a third body portion of the plurality of actors. The system includes a circuit configured to receive a selection of a theme from the plurality of themes. The circuit is further configured to cause the at least one gaming apparatus to display the first set, the second set, and the third set of videos for the selected theme.

20 Claims, 7 Drawing Sheets

Related U.S. Application Data continuation-in-part of application No. 12/365,788, filed on Feb. 4, 2009, now Pat. No. 8,152,621.

(60) Provisional application No. 61/542,094, filed on Sep. 30, 2011, provisional application No. 61/026,404, filed on Feb. 5, 2008.

(51) Int. Cl.
*G07F 17/32* (2006.01)
*G07F 13/00* (2006.01)

(56) References Cited

U.S. PATENT DOCUMENTS

| | | | | |
|---|---|---|---|---|
| 2004/0087359 | A1 | 5/2004 | Cuddy et al. | |
| 2004/0192427 | A1 * | 9/2004 | Seelig et al. | 463/16 |
| 2005/0054423 | A1 | 3/2005 | Wadleigh | |
| 2005/0054441 | A1 | 3/2005 | Landrum et al. | |
| 2006/0148551 | A1 | 7/2006 | Walker et al. | |
| 2006/0160590 | A1 | 7/2006 | Okada | |
| 2006/0287064 | A1 | 12/2006 | Inamura | |
| 2007/0178963 | A1 | 8/2007 | Sato | |
| 2007/0259713 | A1 | 11/2007 | Fiden et al. | |
| 2008/0004093 | A1 | 1/2008 | Van Luchene et al. | |
| 2008/0064501 | A1 * | 3/2008 | Patel | G07F 17/32 463/40 |
| 2008/0102923 | A1 | 5/2008 | Esses et al. | |
| 2008/0125221 | A1 | 5/2008 | Ward et al. | |
| 2009/0197669 | A1 | 8/2009 | Michels | |

OTHER PUBLICATIONS

International Search Report and Written Opinion for International Application No. PCT/US2012/058059, mailed Dec. 13, 2012, 7 pages.

International Search Report and Written Opinion for International Patent Application No. PCT/US2009/033107, mailed Sep. 9, 2009, 11 pages.

Supplementary European Search Report and Search Opinion for European Patent Application No. 09707205.2, mail date Apr. 27, 2011, 5 pages.

* cited by examiner

CUSTOMIZATION APPARATUS AND METHOD

CROSS-REFERENCE TO RELATED APPLICATIONS

This application is a continuation of International Application No. PCT/US2012/058059, filed Sep. 28, 2012, which claims the benefit of and priority to U.S. Provisional Application No. 61/542,094, filed Sep. 30, 2011. International Application No. PCT/US2012/058059 is also a continuation-in-part of U.S. application Ser. No. 13/423,856, filed Mar. 19, 2012, which is a continuation-in-part of U.S. application Ser. No. 12/365,788, filed Feb. 4, 2009, which claims the benefit of and priority to U.S. Provisional Application No. 61/026,404, filed Feb. 5, 2008. The entireties of International Application No. PCT/US2012/058059, U.S. Provisional Application Nos. 61/542,094 and 61/026,404, and U.S. application Ser. Nos. 13/423,856 and 12/365,788, are hereby incorporated by reference in their entireties.

BACKGROUND

The present application relates generally to the field of gaming systems. More specifically, the present disclosure relates to a customizable video slot machine or other games of chance.

Slot machines typically include three or more reels that spin when a user enters money and starts the machine by, for example, pulling a lever provided on the side of the machine. The reels spin, then stop to reveal one of several symbols on the reel. By matching symbols on the reels, a user may win a prize. The reels are generally arranged horizontally and include brightly colored and easily recognizable symbols such as images of fruits or simple shapes such as bells, diamonds, or hearts. Video slot machines substitute mechanical reels for scrolling portions on a video screen. If a user matches the symbols on the reels, they may be allowed to use the winnings to try again or "press the bet" to win a larger prize.

SUMMARY

One embodiment relates to a system for customizing at least one gaming apparatus. The at least one gaming apparatus is operated as a slot machine game. The system includes a storage unit for storing a plurality of themes. Each of the plurality of themes includes a first set of full-motion videos associated with a first body portion of a plurality of actors, a second set of full-motion videos associated with a second body portion of the plurality of actors, and a third set of full-motion videos associated with a third body portion of the plurality of actors. The system includes a circuit configured to receive a selection of a theme from the plurality of themes. The circuit is further configured to cause the at least one gaming apparatus to display the first set, the second set, and the third set of videos for the selected theme. The slot machine game enters a winning state when video shown in the first body portion, the second body portion, the third body portion are associated with a same actor wearing a matching set of clothing.

Another embodiment relates to a computerized method of customizing at least one gaming apparatus. The at least one gaming apparatus is operated as a slot machine game. The method includes receiving, at a processing circuit, a selection of a theme from a plurality of themes. Each of the plurality of themes includes a first set of full-motion videos associated with a first body portion of a plurality of actors, a second set of full-motion videos associated with a second body portion of the plurality of actors, and a third set of full-motion videos associated with a third body portion of the plurality of actors. The method includes causing the at least one gaming apparatus to display the first set, the second set, and the third set of videos for the selected theme. The slot machine game enters a winning state when video shown in the first body portion, the second body portion, the third body portion are associated with a same actor wearing a matching set of clothing.

Further embodiments of the disclosure relate to systems and methods for customizing one or more gaming apparatus such as those described herein. In one exemplary embodiment, a gaming apparatus may be configured to display three body portions of a character on independent portions of a display image, such that a winning state is entered when the same character and/or consistent clothing (e.g., clothing associated with the same theme, such as same colored swimsuit, same uniform, etc.) appears in the three body portions when the gaming apparatus stops varying the portions. A system for customizing the gaming apparatus may be configured to receive user input data relating to a display image that may be displayed on the gaming apparatus while a user is playing. The system may be configured to generate customization data based on the user input data and transmit the customization data to the gaming apparatus. The gaming apparatus may be configured to determine at least one of a character, an article of clothing, and a background image to be displayed while a user is playing the gaming apparatus based on the customization data.

Alternative exemplary embodiments relate to other features and combinations of features as may be generally described in the present disclosure.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
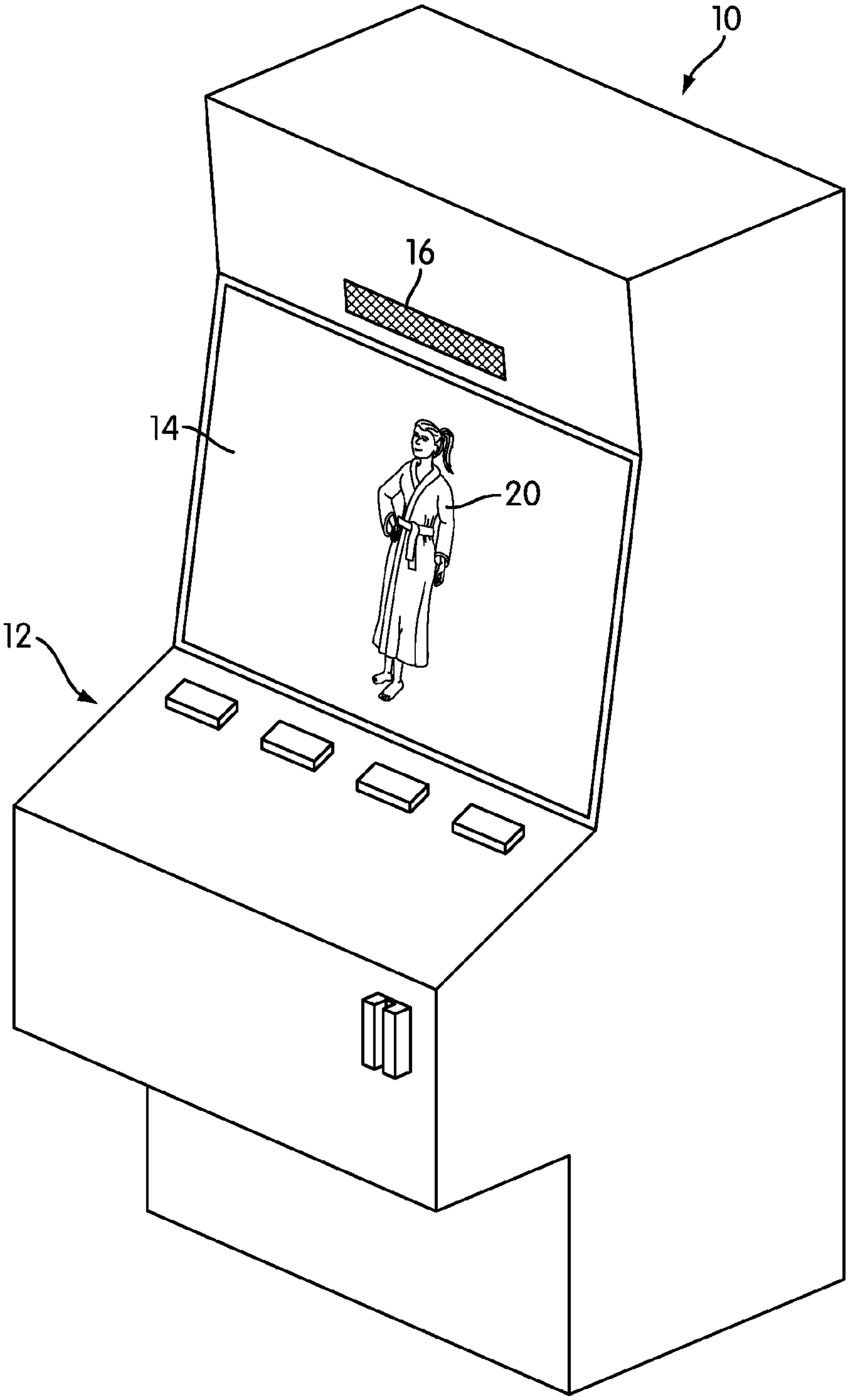
FIG. 1 is a front view of a gaming apparatus such as a slot machine, according to an exemplary embodiment.

Referring to FIG. 1, a gaming apparatus 10 can be a slot machine or similar device. Apparatus 10 can generally be a game of chance and can include a multitude of graphic images (e.g., screen shots, video shots, pictures, etc.) or representations thereof. A player pays money (or some other form of credits) to play the game, which includes a circuit configured in one or more modules (e.g., software and/or hardware) and to rotate or otherwise jumble the graphics. If the graphic images line up in some predetermined pattern, the player wins. According to an exemplary embodiment, gaming apparatus 10 includes a user interface 12 and a display 14. Gaming apparatus 10 may include a slot to receive coins and/or tokens or a magnetic reader to accept credit cards or other items with a magnetic strip. Gaming apparatus 10 can also include an account login feature that allows a user to log into gaming apparatus 10 with account information (e.g., a username and password) to access pre-stored money or credits (e.g., a player's club account, a credit card associated with a hotel room, etc.).

User interface 12 allows a player to start and otherwise control gaming apparatus 10 and select various options (e.g., number of credits to wager, the gender of the model or character, etc.). As shown in FIG. 1, interface 12 includes a multitude of buttons provided below display 14. According to other exemplary embodiments, user interface 12 may include a traditional lever, or any other suitable tactile input device. User interface 12 may be integrated with display 14 (e.g., a touch screen) or may be provided separately from display 14 as shown in FIG. 1. User interface 12 can be a single user interface element (e.g., a single lever or button) or include a plurality of user interface elements.

According to an exemplary embodiment, gaming apparatus 10 operates as a video slot machine and display 14 is configured to show graphical representations of three or more "reels" (e.g., screen portions, screens, etc.). As described below, display 14 changes depending on whether the machine is idle, in use, or in play. While most slot machines include reels with various symbols such as images of fruits or simple shapes such as bells, diamonds, or hearts, gaming apparatus 10 includes images of models or other characters. The models can be clothed in various sets of clothing. Gaming apparatus 10 can be configured to allow a player to win by completing a set of clothing.

Figure 2:
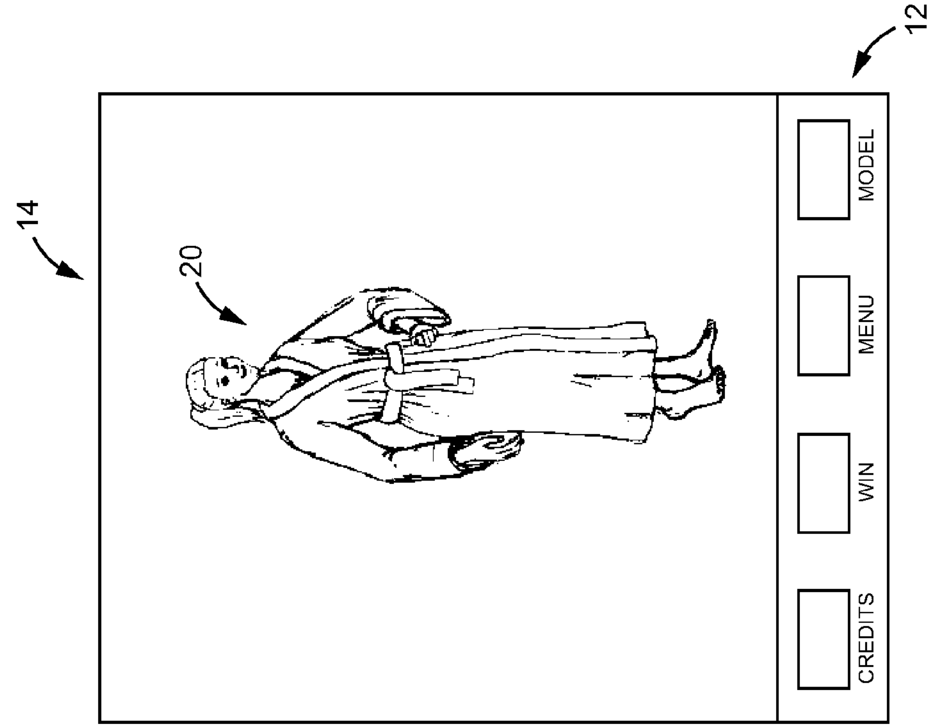
FIG. 2 is a view of a display for the slot machine of FIG. 1 in a first or idle mode, according to an exemplary embodiment.

Referring also to FIG. 2, in an idle mode, when no one is playing, display 14 shows static images or video of a model 20 (e.g., video of a real person) in a bathrobe or other clothing. Model 20 may stand still, dance, shift his or her weight, look bored, or may otherwise be moving or stationary. Audio may be periodically played through an audio system 16 to encourage a user to play. The audio may match the static images or video of model 20. Model 20 may be one of several male or female models that a user can choose from when playing gaming apparatus 10. The choice regarding model 20 can be made at the beginning of a user's gaming session, between tries at the game, or otherwise, based on inputs received from user input device 12. According to an exemplary embodiment, different models are associated with different bets. In yet other exemplary embodiments, different models are associated with different potential pay-outs or odds of winning.

Figure 3:
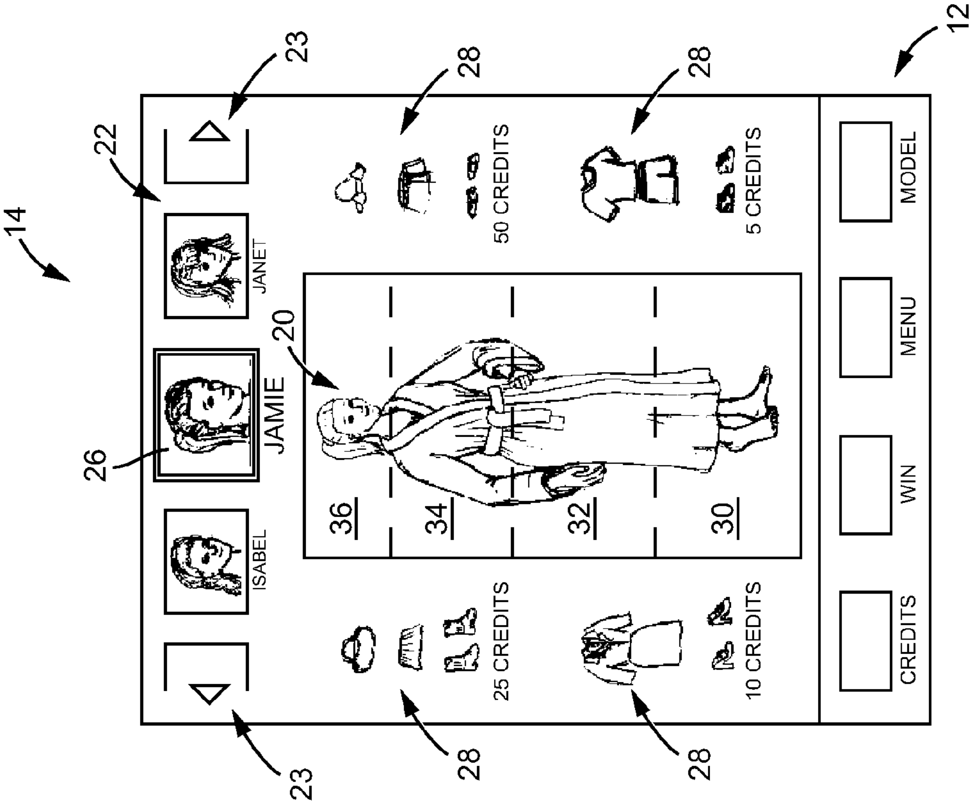
FIG. 3 is a view of a display for the slot machine of FIG. 1 in a second or selection mode, according to an exemplary embodiment.

As shown in FIG. 3, display 14 enters a selection mode when a player begins playing. The selection mode may be triggered, for example, by a player inserting coins or tokens into the machine, a player sitting down at the machine (e.g., based on a signal from a human detection sensor, such as a seat contract switch, capacitive sensor, etc.), or a player pushing any button on interface 12. In the selection mode, display 14 shows more information than in the idle mode.

A portion of display 14, for example, the top of display 14, displays a menu 22 of available characters based on character data retrieved from a memory device. According to an exemplary embodiment, menu 22 includes a multitude of headshots for the various models a user may play with. A user may select a model with a touch screen interface or additional buttons provided proximate to menu 22. Menu 22 may include more models than can be shown on display 14 at once and scroll buttons 23 may be provided to allow a user to view additional models. According to one exemplary embodiment, one model 26 in menu 22 (e.g., the model located in the center of the menu) is highlighted. The highlighted model 26 corresponds to the model 20 shown on a center portion of display 14. By scrolling through menu 22, a user changes the highlighted model 26 and is able to preview the various models before choosing a model with which to play the game.

A portion of display 14, for example, the sides of display 14, shows a multitude of winning combinations 28. According to an exemplary embodiment, winning combinations 28 are matching sets of three pieces of clothing (e.g., cowboy/cowgirl costumes, beach/swim wear, sport wear, formal wear, lingerie, etc.). The matching sets may include a first, a second, and a third article of clothing. In various embodiments, one piece of clothing, a plurality of pieces of clothing, or more than three pieces of clothing may be included in a matching set. In some embodiments, matching sets may include variations on the same articles of clothing. For example, each winning combination 28 may be three pieces of sportswear corresponding to the same professional athletic team. Prize values (e.g., the number of coins or credits a player can win) may be displayed along with each of the matching sets of clothing. The winning combinations 28 are configured to be distinct from each other (e.g., displayed separately) such that a user can easily determine whether a winning combination 28 has been achieved during play. The possible pieces of clothing may have a similar theme for both male and female models or may be provided for only the male or female models.

A central portion of display 14 shows a model 20 in a bathrobe or other clothing, similar to the idle mode. According to an exemplary embodiment, the central portion of display 14 is divided to include a first portion 30, a second portion 32, a third portion 34, and a fourth portion 36. In an alternative embodiment, only one portion, a plurality of portions, or more than four portions may be provided for variable or interchangeable display at each portion. A dividing line (e.g., a dotted line, etc.) or other graphical boundary may be shown between the portions, or the divisions may become clear only when the portions begin changing. According to yet other exemplary embodiments, a division between the portions is not visible or does not exist. The first portion 30, second portion 32, third portion 34, and fourth portion 36 are configured to align with the image of the model such that first portion 30 shows the model's lower legs and feet, second portion 32 shows the model's mid-section, third portion 34 shows the model's upper torso, and fourth portion 36 shows the model's head. Each of the first 30, second 32, and third 34 portions correspond with one of the three pieces of clothing in the matched sets 28 that are revealed and/or varied when gaming apparatus 10 is played. It should be noted that more or fewer portions may be provided, according to various exemplary embodiments.

Figure 5:
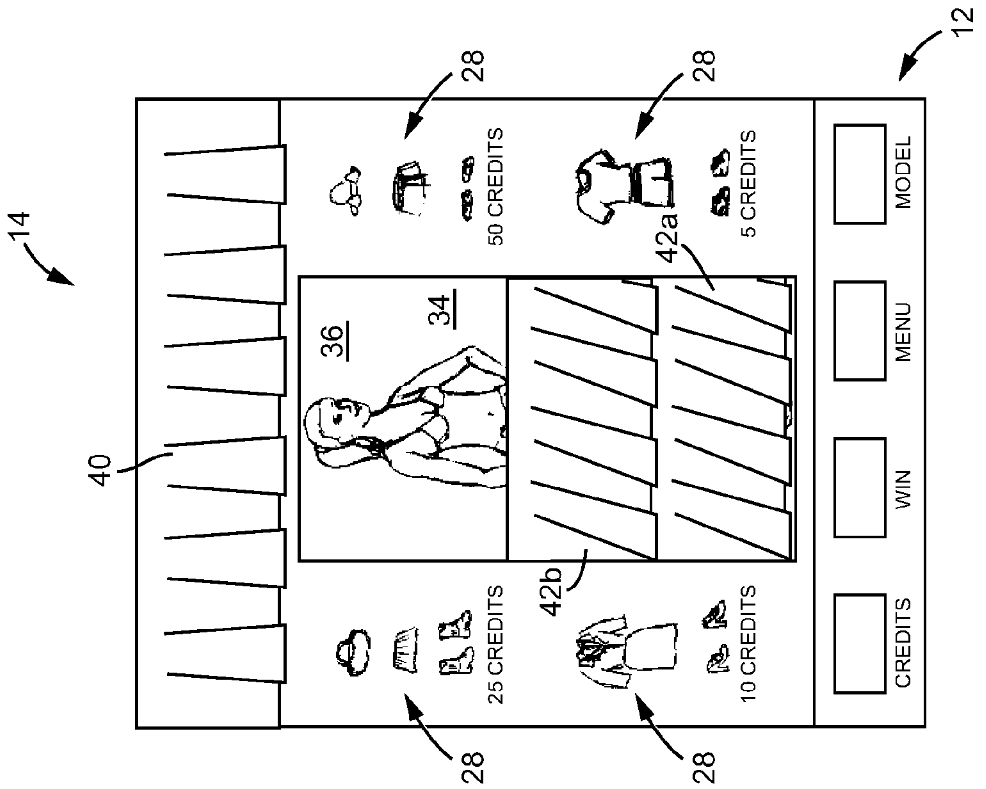
FIGS. 4-7 are views of a display for the slot machine of FIG. 1 in a third or play mode, according to an exemplary embodiment.
Figure 4:
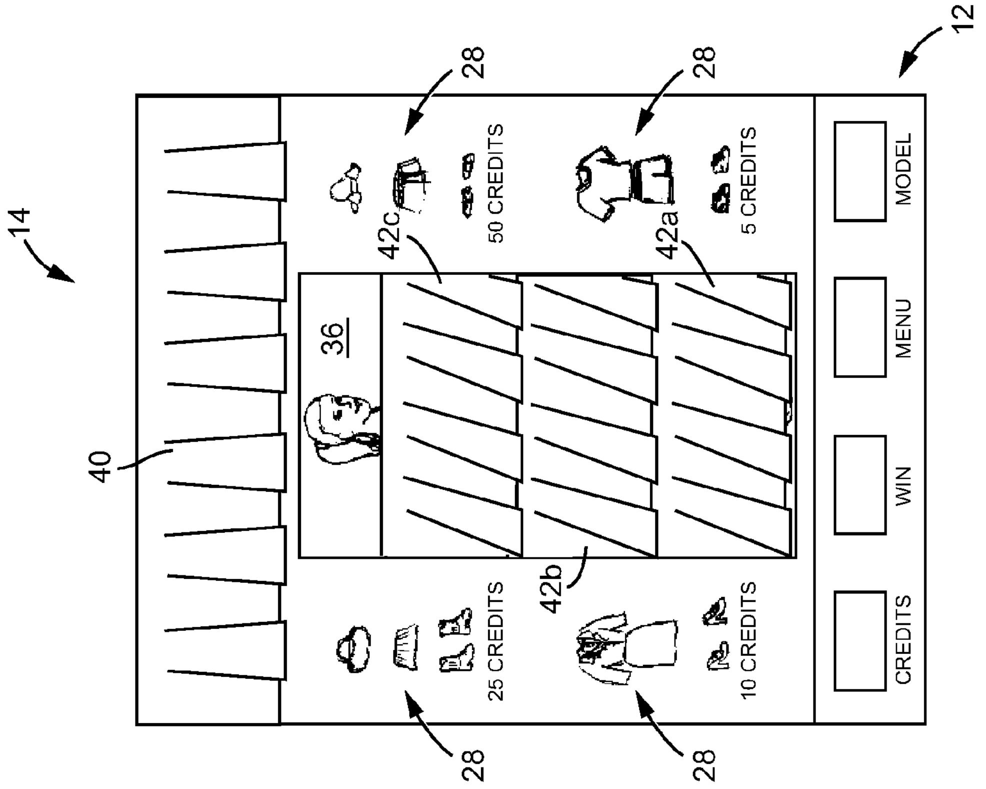
Figure 7:
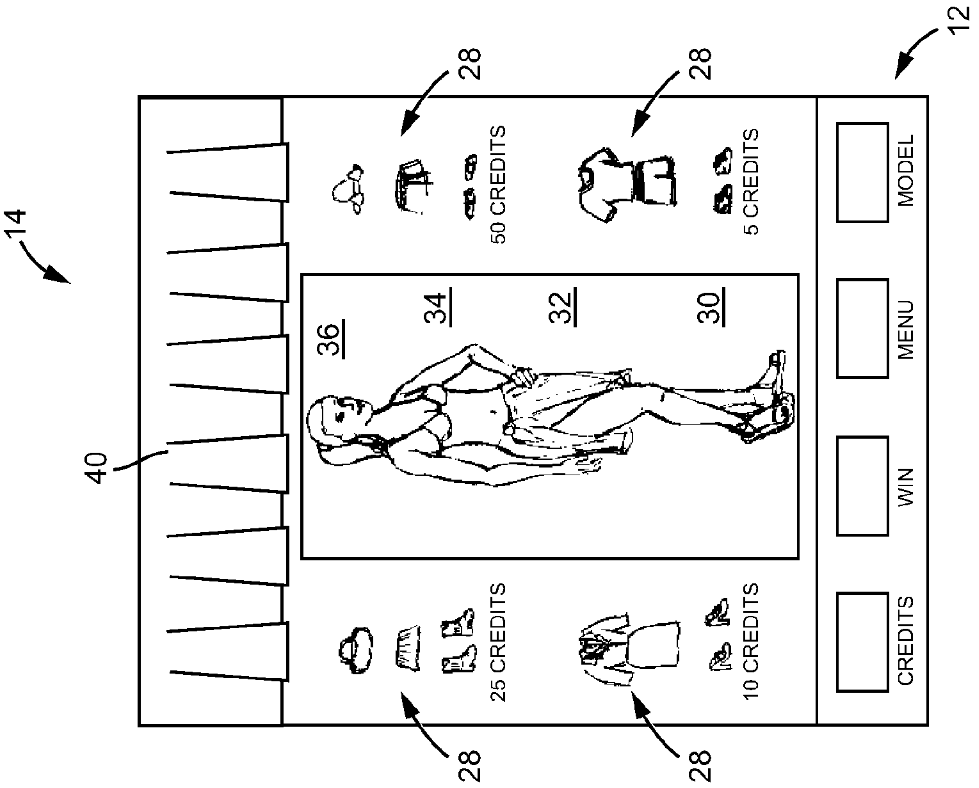
Figure 6:
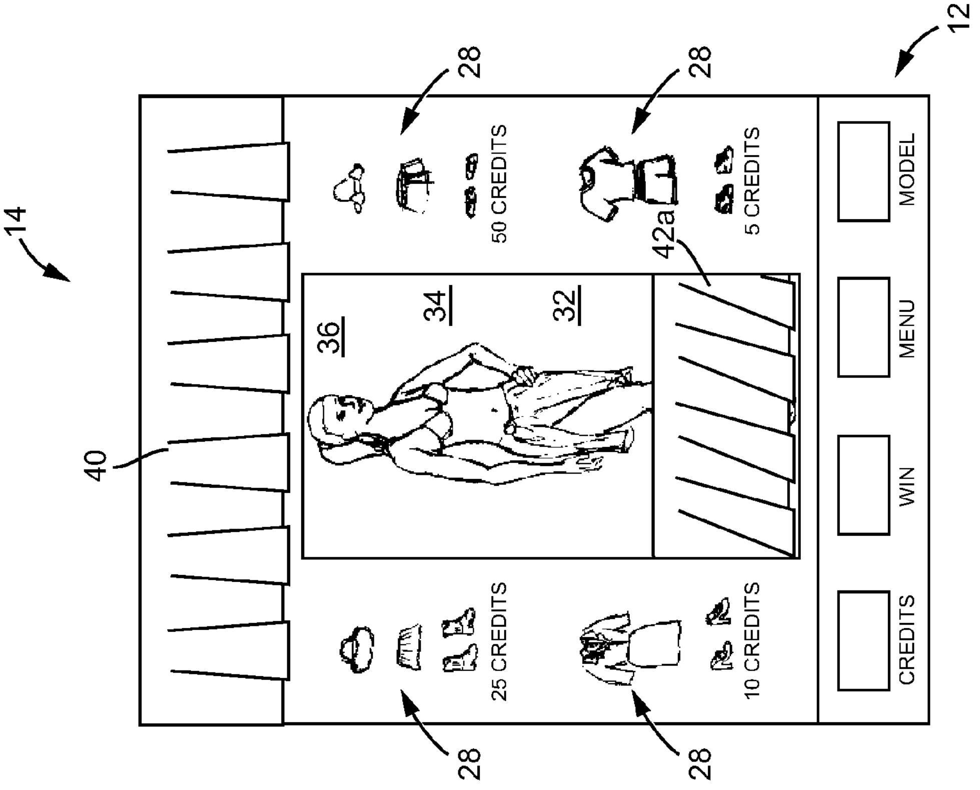

As shown in FIGS. 4-7, when a user begins play the game (e.g., after using user interface 12 to select the model and/or to otherwise trigger the beginning of the game), display 14 enters a play mode. The user begins play by selecting a model and pressing a spin button or otherwise activating a user interface element (e.g., by pulling a lever, by touching a touch-screen area, etc.). Once play is begun, a curtain 40 or other obstruction can cover or obscure menu 22 (e.g., menu 22 can be removed from the screen), such as by displaying a curtain or other obstruction instead of the portion of the character to create the impression of being covered. Curtains 42*a*-42*c* can also cover first portion 30, second portion 32, and third portion 34 of the model, leaving fourth portion 36 uncovered. Curtains 42*a*-42*c* may be animated to move across the central portion of display 14 horizontally and/or vertically such that first portion 30, second portion 32, and third portion 34 correspond to the reels on traditional slot machines. Alternative animation schemes are possible (e.g., spinning cubes, spinning shapes, morphing shapes, morphing images, vertical shades, blinds, etc.). FIG. 5 shows display 14 with curtain 42*c* retracted to reveal an image of the model's upper torso with a first piece of clothing in third portion 34. FIG. 6 shows display 14 with curtain 42*b* retracted to reveal an image of the model's mid-section with a second piece of clothing in second portion 32. FIG. 7 shows display 14 with curtain 42*a* retracted to reveal an image of the model's legs with a third piece of clothing in first portion 30. As curtains 42*a*-42*c* are displayed and moving, the model may offer words of encouragement to the user via a speaker and/or corresponding video or images.

It should be noted that each portion of the display that shows one or more body portions of the one or more characters may be full-motion video of an actual human actor. The full-motion video may be stopped or paused during one or more activities of the system in response to one or more events. According to an exemplary embodiment, the full-motion video may continue throughout all or most stages or activities of the gaming apparatus so that playing the game appears to be a simulation of interaction with a real human. For example, when the curtains are moved over the character, full-motion video of the character appearing to change behind the curtains (e.g., throwing her robe over the curtain, etc.) may continue to play. It should be appreciated that in some embodiments the curtains may not be provided and that full motion video of a character changing from a robe into a matched (or mismatched) outfit may be provided as a part of the game (e.g., in response to a pull of the lever to start the game, etc.).

In one embodiment, curtains 42*a*, 42*b*, and 42*c* are "retracted" in order (e.g., by displaying a portion of the model with the clothing data (e.g., video, images) received from a randomizer or jumbling module). Alternatively, a preset order or random order may be utilized. Curtains 42*a*, 42*b*, and 42*c* may be revealed simultaneously or sequentially. In one embodiment, the user can select with a button which curtain is revealed.

If the images (e.g., videos) revealed by curtains 42*a*-42*c* are a matched set shown as one of the winning combinations 28 on display 14, the user wins the amount listed for that winning combination 28. A control circuit is configured to calculate a credit for the user and to store the credit in memory. Credits can be added by the control circuit to a user's account card, a user's account on a network, or otherwise added to an account. A control circuit can also be configured to cause the dispensing of coins that have collected in the machine or by any other mechanism. Further, the model 20 may celebrate and perform an action that is appropriate for the theme of the clothing. For example if the matched set of clothing is a cowboy/cowgirl costume, the model may slap his or her boot or if the matched set of clothing is swim/beach wear, the model may put on sunglasses. The celebration may be relatively short in duration (e.g., less than thirty seconds, less than fifteen seconds, less than give second, etc.) to minimize the amount of non-gaming action for gaming apparatus 10. In other exemplary embodiments, the model may perform an activity or celebration that rewards the user and is longer in duration (e.g., perform an entertaining dance, which may be more than fifteen seconds, thirty seconds, sixty seconds, etc.).

Figure 8:
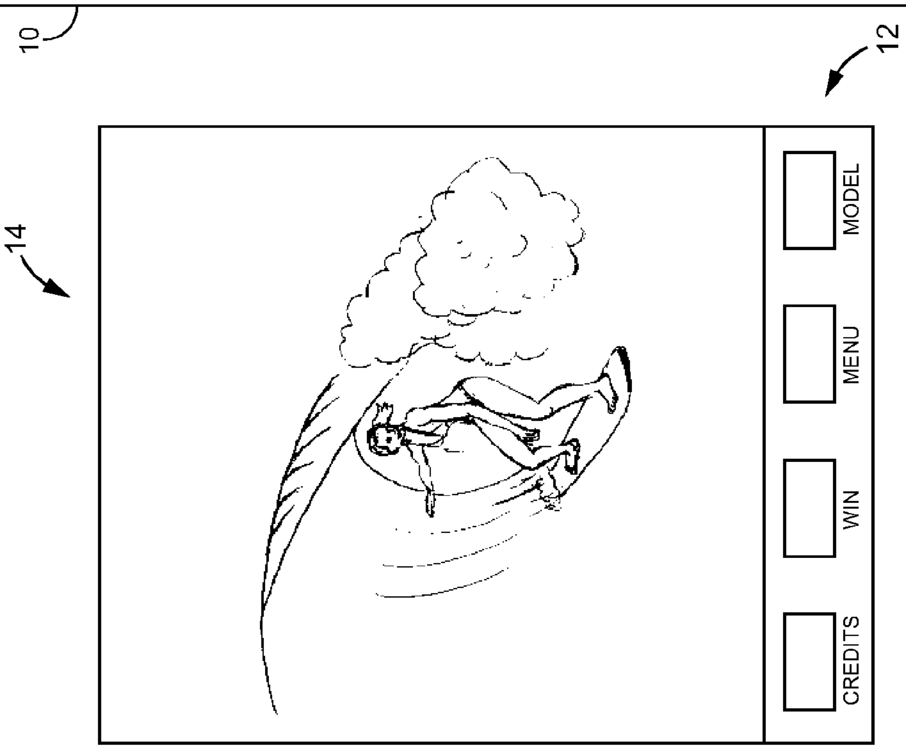
FIG. 8 is a view of a display for the slot machine of FIG. 1 showing a bonus mode, according to an exemplary embodiment.

As shown in FIG. 8, if a user is able to obtain a winning combination 28 (e.g., one time or several times in a row), they may "press the bet" to win more credits by having the model perform some activity that is related to the matched set of clothing 28. For example, a model in a cowboy/cowgirl costume may ride a bull or a model in swim/beach wear may ride a wave on a surfboard. The duration of time the model performs the action determines the amount of additional winnings the user collects. The gaming apparatus can be configured to automatically conduct this activity upon revealing a winning combination 28 or the user may control this activity (e.g., the user selects a button that says "ride the wave for a bonus and bet again!").

To help promote the slot machines and attract new models, gaming apparatus 10 may be configured to tabulate (e.g., by storing statistics in memory) the number of times each model's image is used to play a game by a user. The model may then, e.g., receive a royalty payment for use of their likeness.

Figure 9:
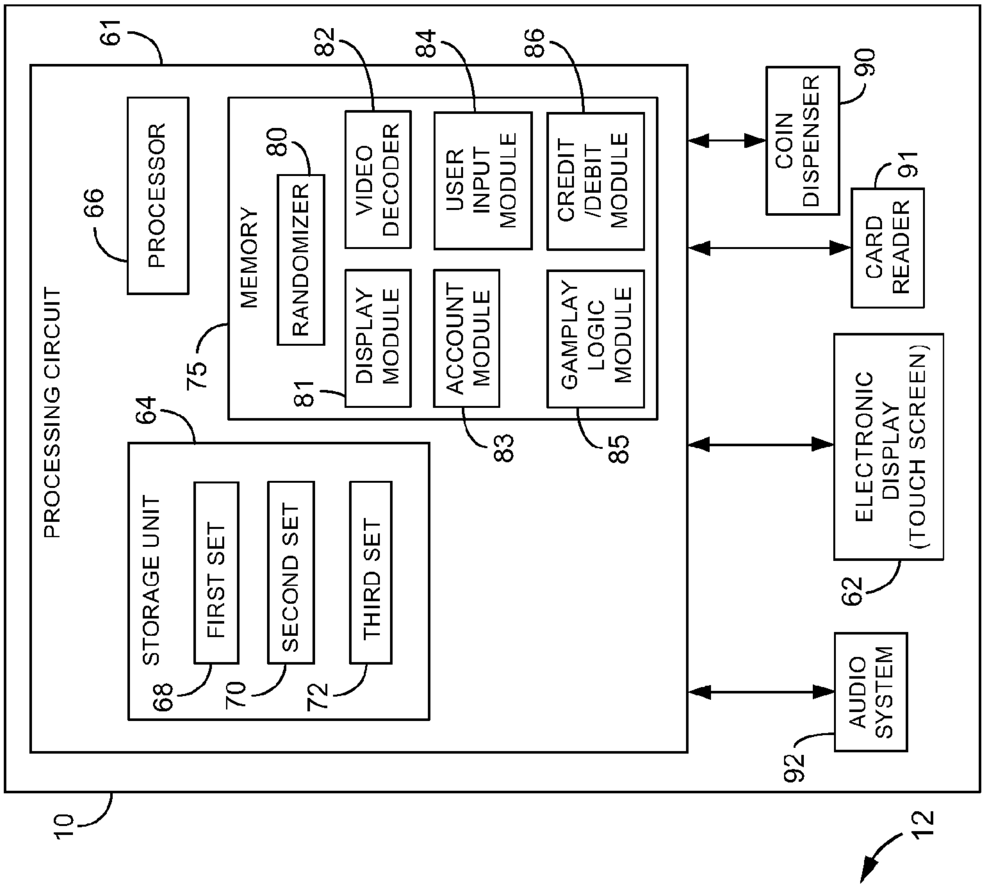
FIG. 9 is a block diagram of an apparatus for use with the display system of FIG. 1, according to an exemplary embodiment.

Referring now to FIG. 9, a block diagram of gaming apparatus 10 is shown, according to an exemplary embodiment. Gaming apparatus 10 includes processing circuit 61 configured to provide output to and to receive input from electronic display 62 (e.g., electronic display 62 being a touch screen). In embodiments where electronic display 62 is not a touch screen, processing circuit 61 may be configured to receive input from one or more user interface elements (e.g., buttons, levers, etc.) provided to a user of gaming apparatus 10. Processing circuit 61 is shown to include a storage unit 64 and a processor 66. Storage unit 64 may include one or more memory devices (e.g., RAM, ROM, disk-based storage, an optical drive and disk, flash memory storage, solid state storage, network storage, network storage via a server computer, etc.) configured to store data/information for recall and use by processor 66. For example, storage unit 64 may be configured to store images (e.g., image files, video files, digital video, etc.). In some embodiments, storage unit 64 can store a first set of first images 68 associated with a first body portion 30 in a plurality of costumes, a second set of second images 70 associated with a second body portion 32 in the plurality of costumes, and a third set of third images 72 associated with a third body portion 34 in the plurality of costumes. In various embodiments, storage unit 64 may store greater or fewer sets of images/videos associated with different, greater, or fewer body portions. The set of images 68-72 are stored for each model or character. Each of the images or video may be captured video or images of real items and/or characters, and/or may be computer-generated video or images (e.g., cartoon images, three-dimensional renderings, etc.), or a combination thereof.

Referring still to FIG. 9, processing circuit 61 can be configured to control electronic display 62 and to cause the electronic display 62 to display a graphical scene. In other words, processing circuit 61 can be configured to control the gaming apparatus and electronic display 62 in particular to conduct each of the activities described herein (e.g., with reference to FIGS. 1-9). The graphical scene can have a first portion including a first image corresponding to a first body portion of one of a number of characters, a second portion including a second image corresponding to a second body portion of one of the number of characters, and a third portion including a third image corresponding to a third body portion of one of the number of characters. Processor 66 can be an application specific integrated circuit (ASIC), a general purpose processor, a specific purpose processor, more than one processors configured to work together, or any other suitable processing part. Processing circuit 61 can be integrated on a printed circuit board, implemented on multiple circuit boards, formed over a network (e.g., the storage unit being remote from the processor) or otherwise implemented. According to an exemplary embodiment, storage unit 64 stores computer code for executing and/or facilitating the steps described herein and processor 66 is configured to execute the computer code stored in storage unit 64. Accordingly, the activities described herein can be implemented in software so that when the computer code is executed the gaming apparatus is configured to conduct the specific activities.

According to an exemplary embodiment, processing circuit 61 can include a number of software and/or hardware modules configured to execute and/or facilitate the execution of the activities described herein. In FIG. 9, modules 80-86 are shown in memory 75. Modules 80-86 may be computer code, object code, script code, an executable, and/or any other software or hardware that configures processing circuit 61 to conduct one or more activities. It should be noted that memory 75 may be the same or different than storage unit 64. For example, storage unit 64 may be disk storage while memory 75 is solid state memory. Referring to modules 80-86, randomizer 80 may be configured to randomize, jumble, or otherwise vary the video and/or images provided to electronic display 62 while the game is active. Randomizer 80 may include a random number generator (e.g., providing a truly random outcome) or different outcomes can be varied based on a weighted function or another algorithm that provides a quasi-random outcome. The output from the randomizer may be used to select one or more first, second, third sets of video/images from storage unit 64. Display module 81 may be configured to drive and/or otherwise control electronic display 62 (e.g., to expose application programming interfaces or other functions of electronic display 62 to the other modules or components of processing circuit 61). Video decoder 82 may include decoding logic for the playback of video and/or images stored in storage unit 64. For example, the video stored in storage unit 64 may be compressed using, for example, an MPEG4 or DIVX format and video decoder 82 may be configured to decompress and otherwise decode for playback the video. Account module 83 can be configured to track a user account, access a user account, or otherwise manage one or more user accounts relative to gaming apparatus 10. User input module 84 can be configured to process signals and/or data received from user input elements (e.g., a lever, buttons, etc.) of the gaming apparatus. Statistics module 87 may be configured to receive processed data from user input module 84 and store data corresponding to users' input (e.g., the number of times a particular model is selected). Processing circuit 61 may be configured to output the data to, e.g., a computing device. Gameplay logic module 85 may be configured to command the sequences of user and gaming apparatus activities during one or more games. For example, gameplay logic module 85 can be configured to cause the display to prompt a user for a bet, begin the randomizer, use the output of the randomizer to select one or more sets of video or images for playback on electronic display 62, check for one or more winning conditions, enter a winning mode when the one or more winning conditions are met, utilize an account module to associate a game outcome with a certain user, and the like. Gameplay module may also report bets and game outcomes to credit/debit module 86 which can be configured to debit (or credit) a user's account depending on the outcome of the game. Input received at card reader 91 (e.g., magnetic card reader, near-field communication reader, etc.) can be used to add or remove credits via credit/debit module 86. Credit/debit module 86 can also cause coin dispenser to dispense an appropriate winning for a user when a win state is entered. Audio system 92 can be controlled by processing circuit 61 (e.g., provided audio by video decoder 82) when video is played back or otherwise (e.g., to "ring" when a winning state is entered).

It should be noted that, according to various exemplary embodiments, the gaming apparatus (e.g., gaming device, slot machine, etc.) connected to a display includes any circuit configured to cause a character to be displayed on the display wearing multiple pieces of clothing, the circuit being configured to vary the pieces of clothing shown on the character when a game is played. In other words, it should be noted that while different portions and different images may be cycled through (e.g., randomized, jumbled, spun, etc.) the gaming apparatus may be configured to "land on" or otherwise select one video (which may be a winning video) for playback on the display. For example, rather than the cycle of different portions, a user may pull the lever and the character may begin dressing (or undressing) to reveal a winning (or losing) combination of pieces of clothing in full-motion video. Accordingly, processor 66 may be configured to determine if a user wins or not immediately (near immediately) when the user pulls a lever or otherwise activates the system. Depending on whether the user has won (and what the user has won), processor 66 will begin playing a video involving the character that will reveal (e.g., via what the character ends up wearing) whether the user has won. Accordingly, processor 66 may be configured to enter a winning state (e.g., a winning routine, which may include video playback, calculating a winning, showing the winning to the user, ringing bells, etc.), for the game when the pieces of clothing shown on the character match once the varying of the pieces of clothing is discontinued. In other embodiments the winning state may be entered when the user plays the game, with the display changing to make the user feel as if they are watching the determination in real time (e.g., even though it has already been determined). It should be noted that the winning state may be controlled by gameplay logic module 85 as shown with reference to FIG. 9 or may be controlled by one or more other logic modules (e.g., routines, computer code functions, etc.) in memory 75 of processing circuit 61. For example, gameplay logic module 85 may utilize randomizer 80 results, account module 83, and/or any number of other modules or calculations to determine if one or more conditions for entering a winning state exists. When the conditions for entering a winning state exist (e.g., when the video shown in the first, second, and third portions of a graphical scene are associated with the same character wearing matching clothing), gameplay logic module 85 may store data regarding the win state in memory (e.g., update one or more variables stored in memory), trigger one or more functions (e.g., a function to cause the display of a winning video, a function to calculate a user's winnings, a function to sound an alarm and flash lights on the slot machine, etc.). In other exemplary embodiments, entering a win state may trigger other parts of the game (e.g., a "bonus round," a multiplier routine, allow the user to "double-down" or otherwise increase his or her bet, or the like). In yet other embodiments, a winning state is entered whenever the conditions for a game win are determined by a processing circuit of the gaming apparatus.

Customization System

Figure 10:
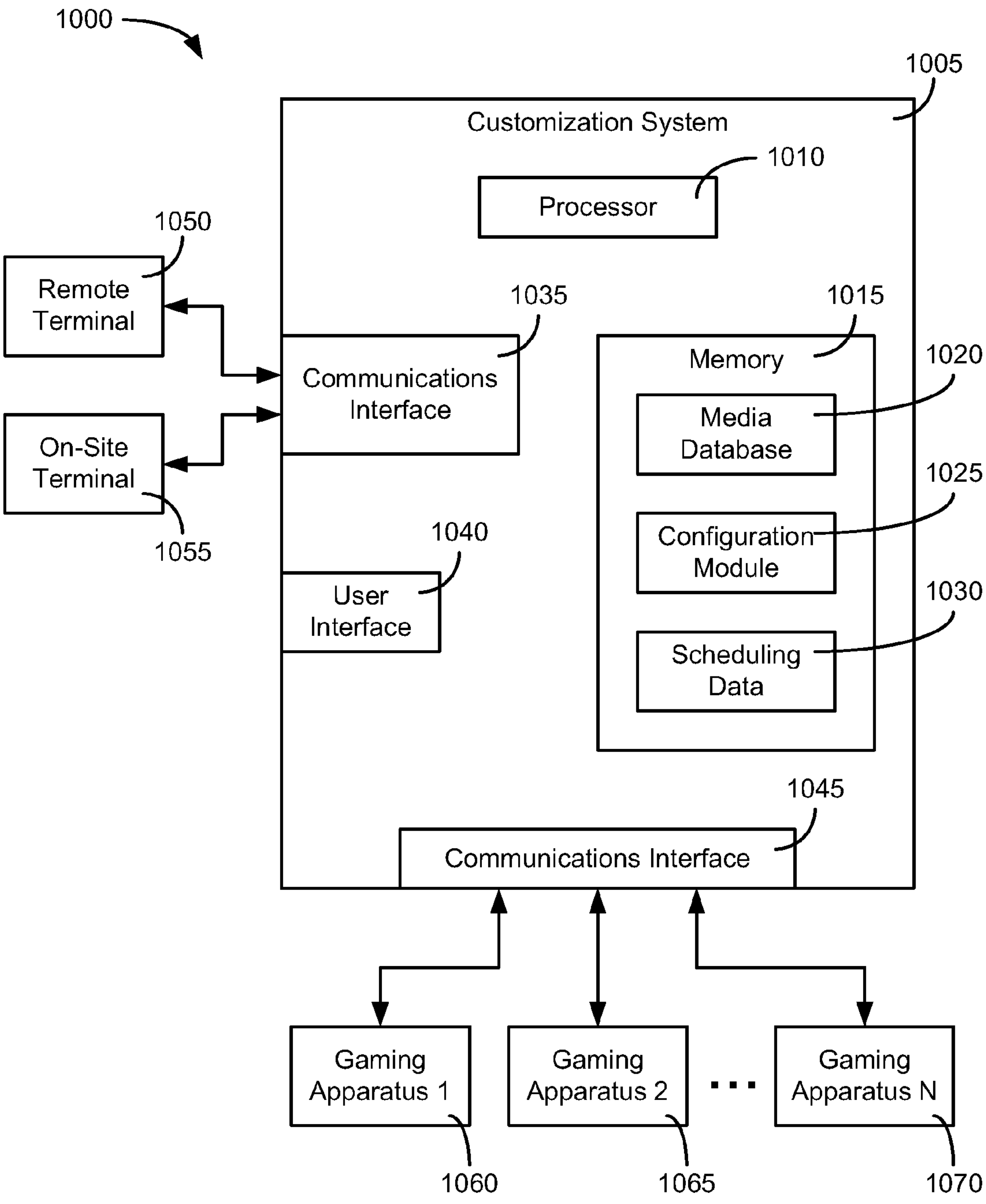
FIG. 10 is a block diagram of an apparatus for customizing a gaming apparatus, according to an exemplary embodiment.

In some embodiments, one or more aspects of the gaming apparatus may be customized using a customization system and/or method. FIG. 10 illustrates a customization environment 1000 including a customization system 1005 configured for use in customizing one or more gaming apparatus (e.g., such as gaming apparatus 10) according to an exemplary embodiment. Customization system 1005, alone or in combination with other components such as those illustrated in FIG. 10, may be used to customize various aspects of the gaming apparatus, such as the images displayed on a display of the gaming apparatus. For example, the model appearing in the display image, the clothes the model is wearing, the background behind the model, and/or various other aspects of the image could be changed or customized to correspond to various marketing campaigns or promotions. In some embodiments, portions of the display image may be changed to correspond or call attention to a setting or theme, such as noticeable features of a facility (e.g., a casino) in which the game is being operated, attractions (e.g., shows or performances) offered at the facility or one of the promotional partners of the facility, products offered for sale at the facility or by one of the promotional partners of the facility, etc. In some embodiments, the display images may be changed regularly (e.g., periodically, at predetermined dates, upon the occurrence of certain events, etc.) to highlight different marketing or promotional efforts of the machine or facility operators or owners and/or their promotional partners. In some embodiments, the display images may be changed on an ad hoc basis.

Customization system 1005, as illustrated, may be a server system configured to receive input relating to the desired customization of one or more gaming apparatus 1060, 1065, . . . , 1070 and transmit customized data to the gaming apparatus 1060, 1065, . . . , 1070 based on the input. For example, the desired customization may include the selection of a theme for the winning combinations of clothing from among a plurality of themes. Customization system 1005 may be a processing circuit including a processor 1010 (e.g., any general purpose or special purpose processing circuit) and a storage unit/memory 1015 (e.g., any tangible computer-readable storage medium). Customization system 1005 may receive the selection of a theme, and in response thereto, customization system 1005 may cause one or more gaming apparatuses to display, e.g., a first set, a second set, and a third set of videos for the selected theme. In some embodiments, customization system 1005 may provide, e.g., a first set, a second set, and a third set of videos for the selected theme to one or more gaming apparatuses. In some embodiments, customization system 1005 may cause the display of a user interface for receiving the selection of one of the plurality of themes. Customization system 1005 may also include one or more communications interfaces 1035, 1045 configured to receive and/or transmit data to other computing systems and/or devices. For example, a communications interface 1035 may be configured to receive data from one or more terminals 1050, 1055 that may be used to customize the gaming apparatus 1060, 1065, . . . , 1070. A communications interface 1045 (e.g., a wired or wireless network interface, such as Ethernet or WiFi) may be used to transmit data to gaming apparatus 1060, 1065, . . . , 1070 that may be used to customize various aspects of gaming apparatus 1060, 1065, . . . , 1070, such as the images that are displayed when a user is playing gaming apparatus 1060, 1065, . . . , 1070. In various embodiments, the same or different communications interfaces may be used by customization system 1005 to communicate with terminals 1050, 1055 and gaming apparatus 1060, 1065, . . . , 1070. In some embodiments, customization-related data may be received directly by customization system 1005 through the use of a user interface 1040, such as a keyboard and mouse, touchscreen, etc. According to an exemplary embodiments, customization system 1005 is remote from gaming apparatus 1060, 1065, . . . , 1070. By utilizing a server configuration for customization system 1005, a slot manager or other operator may be enabled to customize one or more gaming apparatus 1060, 1065, . . . , 1070 without having to physically be present at or open gaming apparatus 1060, 1065, . . . , 1070 to access a programming interface.

Memory 1015 may be configured to store one or more modules (e.g., instructions that are executable by a processor to perform various functions) that are configured to perform one or more functions of customization system 1005 and/or one or more databases that are configured to store data relating to the customization of gaming apparatus 1060, 1065, . . . , 1070. For example, a configuration module 1025 may be used to configure the operation of gaming apparatus 1060, 1065, . . . , 1070 based on customization-related input received, for example, from one or more terminals 1050, 1055. Customization system 1005 may be configured to store media used to generate the customized gaming environments and/or images (e.g., images/videos of models, clothing for the models, background images to be displayed behind the models in the game, etc.) in a media database 1020. In some embodiments, media database 1020 may store, for each of a plurality of themes, a first set of full-motion videos associated with a first body portion of a plurality of actors, a second set of full-motion videos associated with a second body portion of the plurality of actors, and a third set of full-motion videos associated with a third body portion of the plurality of actors.

Gaming apparatus 1060, 1065, . . . , 1070 may be customized in any or all of a variety of different ways, according to various exemplary embodiments. In some embodiments, images shown on gaming apparatus 1060, 1065, . . . , 1070 while a user is playing may be adapted based on one or more marketing efforts that the operators (e.g., casinos, gaming companies, etc.) of gaming apparatus 1060, 1065, . . . , 1070 may wish to highlight. For example, if a casino is hosting a particular type of event, models shown in the game while the user is playing may be used that are related to the event, clothes on the models may be related to the event, images shown in the background behind the models may be related to the event, etc. In one specific exemplary embodiment, a casino hosting a construction convention may choose to customize the games offered on gaming apparatus 1060, 1065, . . . , 1070 to feature models wearing construction clothing or backgrounds relating to construction.

In some embodiments, a background shown behind a model in the games may be customized. For example, a gaming apparatus operated at the Bellagio casino in Las Vegas, Nev. may be customized to feature a moving water show in the background of the model reminiscent of the well-known dancing fountain show in the front of the facility, or a gaming apparatus operated in the Venetian casino may feature a gondola traveling down a canal. In some embodiments, the background may be related to a special promotion that the operator or a promotional partner wishes to highlight to users, such as a product sold by an owner of the facility or a partner or an attraction offered by the owner or partner. For example, logos, images, videos, and/or other types of media relating to a show that is playing at a casino may be displayed in the background of the model. In other examples, various products (e.g., sold in a gift shop of the casino) may be displayed in the background of the model. In some embodiments, the images of the models used in the game may be captured by placing the models in front of a green screen, such that the background behind the model may be easily customized using separately captured and/or generated images. For example, the image may be customized to make it appear that the model is attending an event or show at the resort or casino in which the gaming apparatus is operated.

In some embodiments, the clothing worn by the model may be customized. In some embodiments, the winning combinations may be associated with a particular theme. Each theme may include a plurality of matching sets of clothing for a plurality of actors. Each matching set of clothing may include a first article of clothing for the first body portion, a second article of clothing for the second body portion, and a third article of clothing for the third body portion. For each matching set and for each actor, the themes may include a first image/video corresponding to a first body portion, a second image/video corresponding to a second body portion, and a third image/video corresponding to a third body portion. For example, the clothing may be clothing related to theme or feature of a casino or casino partner, such as a Roman outfit at Caesar's Palace casino. In another example, the clothing may be customized to feature a particular event, such as a firefighter's outfit when a firefighter convention is being held at a casino. The winning combinations may include variations on the particular theme (e.g., different matching sets of clothing). In the example above, different winning combinations may include clothing for the fire departments of different municipalities (e.g., New York City Fire Department, Los Angeles Fire Department, etc.). In some embodiments, the clothing may be customized to feature a product or service that is available for sale by the casino or a partner of the casino or an attraction that is offered by the casino or a partner. For example, a Bebe outfit offered for sale at the Bellagio may be a winning clothing combination for a gaming apparatus operated at the Bellagio. A t-shirt from the "Elvis" show that is featured at the Aria casino may be part of the winning clothing combination for a gaming machine operated at the Aria.

In some embodiments, companies may pay to have certain products or brands featured within the clothing items or backgrounds of the game. For example, a company that produces a particular brand of boots (e.g., Ugg) may have the casino or a marketing partner of the casino customize one or more games to feature a new line of the company's boots. In some embodiments, the gaming apparatus may be customized to execute one or more additional actions intended to highlight the product or brand. Customization system 1005 may store a background image, an action sequence in response to a winning state of the slot machine, and audio for a given theme. In response to the selection of a theme, customization system 1005 may also cause one or more gaming apparatuses to display the background image of the selected theme, display the action sequence of the selected theme, and/or play the audio corresponding to the selected theme. For example, on a winning combination, the model who is wearing the new boots in the game may shout out the product name and/or say "I love my new Brand X boots!" Customization system 1005 may also store an information sequence, with video, image, and/or text corresponding to a particular theme. The information sequence may be displayed in response to the winning state of the slot machine. For example, the background may change to a storefront where the product can be found, or a new screen may be displayed showing information relating to the product.

In some embodiments, the models themselves may be customized. For example, Hooters calendar models may be used as models in gaming apparatus operated at Hooters casino, Miss America contestants may be used as models in gaming apparatus operated at Planet Hollywood casino, Cirque du Soleil characters or performers may be used as models in gaming apparatus at casinos featuring Cirque du Soleil shows, Playboy Playmates may be used as models in gaming apparatus at the Palms casino where the Playboy Club is located, etc.

In some embodiments, various features of the gaming apparatus, such as the images of the models, background images, etc., may be configured so as to not provide clues to the user as to whether or not the user has won before the round of the game has concluded (e.g., the reels have stopped). For example, the images of the model (e.g., winning images, losing images, etc.) may be configured to have consistent features such as height, width, etc. In some embodiments, the images/videos of the models may be captured at a central location, using one photography/videography company, using a set of parameters to ensure continuity between images, etc. In some embodiments, a program provider and/or apparatus owner may have a server based contact with the provider to control the content displayed in the games.

In some embodiments, media elements other than visual elements may be customized, such as audio elements. In some embodiments, the language used in spoken words and phrases in the game may be customized. For example, if a convention of Japanese businessmen is being held at a particular facility, the operator of that facility may choose to customize the spoken language used in some games to be in the Japanese language. In some embodiments, the language may be selectable by a user of the gaming apparatus. Customization system 1005 may store text and/or audio for plurality of languages and be configured to receive a selection of one of the languages. Customization system 1005 may also cause one or more gaming apparatuses to display text corresponding to the associated language and/or play audio corresponding to the selected language. In some embodiments, other audio features, such as sound effects, may additionally or alternatively be customized.

In some embodiments, various aspects of the games provided on gaming apparatus 1060, 1065, . . . , 1070 may be customized automatically according to a schedule instead of or in addition to being manually customized by a technician or other operator of customization system 1005. For example, a promotional schedule may be provided to customization system 1005 and stored in a scheduling database 1030. Customization system 1005 may store an indication of time when one or more gaming apparatuses will display a first set, a second set, and a third set of videos for the selected theme. The indication of time may include a year, a month, a day, a time, and/or a range of any combination thereof. Customization system 1005 may be configured to automatically cause the gaming apparatuses to display the videos for the selected theme at the indicated time. Scheduling database 1030 may be used to determine dates and/or times at which certain customization changes may occur at one or more gaming apparatus 1060, 1065, . . . , 1070. For example, a particular casino may have a scheduled rotation of performances that will occur in the theater of the casino. Media relating to one or more of the scheduled performances may be stored in media database 1020, and scheduling data 1030 may be used by configuration module 1025 to determine when the one or more gaming apparatus 1060, 1065, . . . , 1070 should be customized to promote the performances (e.g., customize on a start date of the performances, on one or more dates that the casino wishes to promote the performance, etc.). In this manner, casino operators and/or their promotional partners may plan and execute game customizations relating to a marketing plan or schedule without the need for a technician to manually update the customization on the day and/or time that the casino wishes for the promotional customization to begin.

In various exemplary embodiments, input data used to customize the games presented using gaming apparatus 1060, 1065, . . . , 1070 may be provided in any or all of a number of different ways. For example, in some embodiments, input may be provided locally to customization system 1005 using user interface 1040. In some embodiments, input may be provided using an on-site terminal 1055 that is local to a facility in which customization system 1005 and/or one or more gaming apparatus 1060, 1065, . . . , 1070 are located and may or may not be physically located in proximity to customization system 1005. For example, an employee in a marketing department of a casino may provide input via a computing terminal located in offices of the casino. In some embodiments, input may be provided remote from the facility, customization system 1005, and/or gaming apparatus 1060, 1065, . . . , 1070 using a remote terminal 1050. For example, a casino may contract with an outside promotional or marketing company to organize marketing promotions for the casino, or the casino's marketing department or employees may be located off-site, and a remote terminal 1050 may be used to provide customization information. In some embodiments, data (e.g., video data) corresponding to a first set, a second set, and a third set of videos may be received at customization system 1005 via terminals 1050, 1055 (or user interface 1040). Customization system 1005 may store the received data in a storage unit (e.g., memory 1015).

In some embodiments, customization system 1005 may be configured to transmit customization data to gaming apparatus 1060, 1065, . . . , 1070, and each of gaming apparatus 1060, 1065, . . . , 1070 may be configured to store data in a local memory based on the received customization data and customize its operations (e.g., what images or other media are displayed while the user is playing, what combination of displayed items constitutes a winning combination and/or what credit value is allocated to a user for particular combinations, and/or other actions that occur in the gaming apparatus) based on the stored data. In other embodiments, gaming apparatus 1060, 1065, . . . , 1070 may act as a thin client type of apparatus, where some basic software is provided in gaming apparatus 1060, 1065, . . . , 1070 to allow gaming apparatus 1060, 1065, . . . , 1070 to operate, but much of the functionality of the user experience is provided to gaming apparatus 1060, 1065, . . . , 1070 (e.g., dynamically while a user is playing) from customization system 1005. For example, a user may register credits into gaming apparatus 1060, 1065, . . . , 1070 and use a user interface to start the game. Gaming apparatus 1060, 1065, . . . , 1070 may transmit a signal to customization system 1005, and customization system 1005 may transmit data to gaming apparatus 1060, 1065, . . . , 1070 that is used to determine what should be displayed. In some such embodiments, customized images may be displayed on gaming apparatus 1060, 1065, . . . , 1070 without having to store all of the images (e.g., for a long period of time) on gaming apparatus 1060, 1065, . . . , 1070.

In some embodiments, the customization may be performed directly on each of the gaming apparatus. For example, a portable customization system (e.g., a laptop computer) may communicate with a gaming apparatus (e.g., via a wired communications or input/output interface of a gaming apparatus, such as a USB or serial port, or a wireless connection, such as a secured Bluetooth, WiFi, or other wireless connection), and the gaming apparatus may be customized and/or modified locally. In some embodiments, the customization system may be built into the gaming apparatus (e.g., included in the instructions stored in the memory of the gaming apparatus), and a technician may utilize a user interface of the gaming apparatus (e.g., a display, buttons, a touchscreen, etc.) to set various parameters and/or to provide new images, videos, and/or other media to the gaming apparatus without the need to communicate with an outside computing device. In some such embodiments, the gaming apparatus may be equipped with an input/output interface configured to receive the media content, such as a USB port or a flash memory card reader.

In some embodiments, one or more of the terminals (e.g., terminals 1050 and/or 1055) may be configured to communicate directly with the gaming apparatus and serve as customization systems. For example, various customization features may be provided within an application accessible by the terminals (e.g., an application installed on the terminals and/or an application provided via a communications network, such as a web-based program). In some embodiments, users of the terminals may be required to enter authentication information to ensure that the users are authorized to make changes to the gaming apparatus.

Figure 11A:
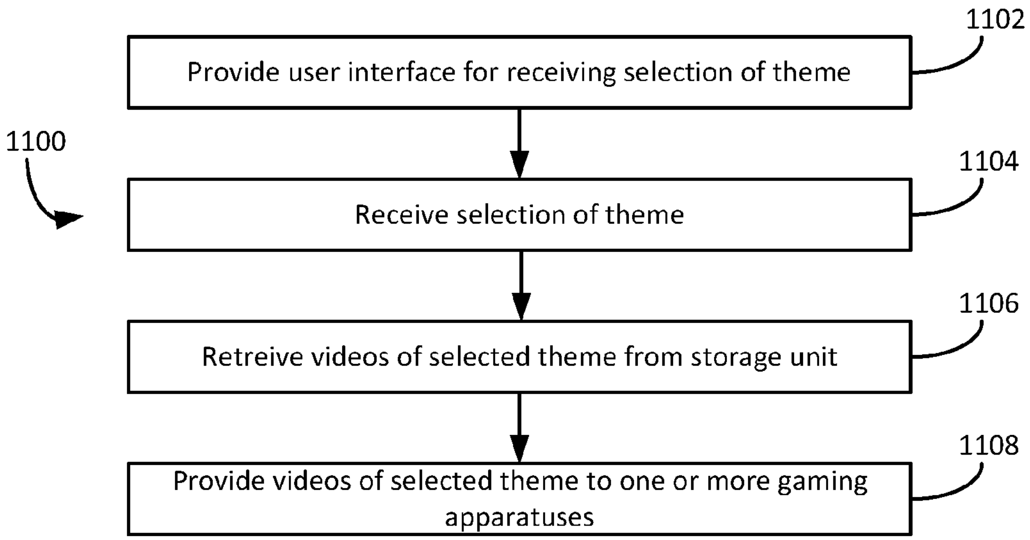
FIG. 11A is a flow chart of a process for providing videos of selected themes to one or more gaming machines according to an exemplary embodiment.

Referring to FIG. 11A, a flow diagram of a process 1100 for customizing one or more gaming apparatuses is shown, according to an exemplary embodiment. Process 1100 may be implemented by customization system 1005 (FIG. 10). Process 1100 may generally describe a server-based customization system for receiving a selection of a theme and providing a selected theme to one or more gaming apparatuses.

Process 1100 includes providing a user interface for receiving a selection of a theme (1102). In some embodiments, a user (e.g., an operator of a casino) may access customization system 1005 via, e.g., a remote terminal 1050 or on-site terminal 1055 (FIG. 10). Customization system 1005 may provide display data to the remote terminal 1050 or on-site terminal 1055 to cause the display of a user interface (e.g., a selection screen) for receiving the selection of a theme. The user interface may be configured to show, e.g., a summary of the themes that are currently stored in a storage unit/memory of the customization system (i.e., themes that are available for selection) and the themes that are currently being implemented on one or more gaming apparatuses (e.g., at one or more locations). The user interface may also show representations of the locations of the gaming apparatuses.

Process 1100 includes receiving a selection of a theme (1104). A user may select a theme to implement on one or more gaming apparatuses at one or more locations. For example, at a location that is hosting a conference for fire departments, a user may designate that all of the gaming apparatuses at the location provide videos associated a fireman theme. A user may designate that a portion of gaming apparatuses provide one theme while another portion of gaming apparatuses provide a second theme. The user may make a selection of the theme at a user interface provided by the customization system (step 1102).

Process 1100 includes retrieving videos associated with the selected theme from the storage unit (e.g., memory 1015 of FIG. 10). Processor 1010 (FIG. 10) may determine which videos correspond to the first set, second set, and third set of videos of the selected theme. Process 1100 includes providing videos of the selected theme to one or more gaming apparatuses (1108). According to an exemplary embodiment, the videos may be provided to the gaming apparatuses via a wired or wireless communications network. In some embodiments, the videos may be provided for storage on the gaming apparatuses. The gaming apparatus may access the locally stored videos during the slot machine game. In some embodiments, the videos may be provided to the gaming apparatus from the customization system each time the slot machine game is operated (via, e.g., streaming video). In some embodiments, a background image, an action sequence in response to the winning state of the slot machine game, and audio associated with the selected theme may also be provided.

In some embodiments, the customization system may be configured with data to recognize or estimate a player's preferences or retrieve a player's previously stored preferences. For example, in a casino with a player's club card or similar ID/charge card system, a player may have entered preferences for his or her preferred theme. In some embodiments, a player's credit card may be associated with the player's preferences. The customization system may provide the theme in accordance with the player's preferences when the player's ID/charge card is used. For example, a female player may have designated that male actors in fireman clothing sets should be displayed when she plays the slot machine game. Accordingly, when the female player uses her card, customization system 1005 may provide the corresponding theme to the gaming apparatus she is using. In some embodiments, the customization system may be able to retrieve information about to player to determine themes to provide. For example, a player's occupation may be known to a credit card provider. When the player utilizes the credit card at a gaming apparatus, the customization system may provide a theme relating the occupation. For example, if the player is a fireman, customization system 1005 may provide sets of videos with winning sets of fireman uniforms. In some embodiments, customization system 1005 may be configured to predict a player's preferences. For example, a customization system 1005 may be able to predict a player's gender. Thus, the customization system 1005 may be able to provide female actors in variations of sportswear associated with athletic teams when a male player operates the gaming apparatus.

Figure 11B:
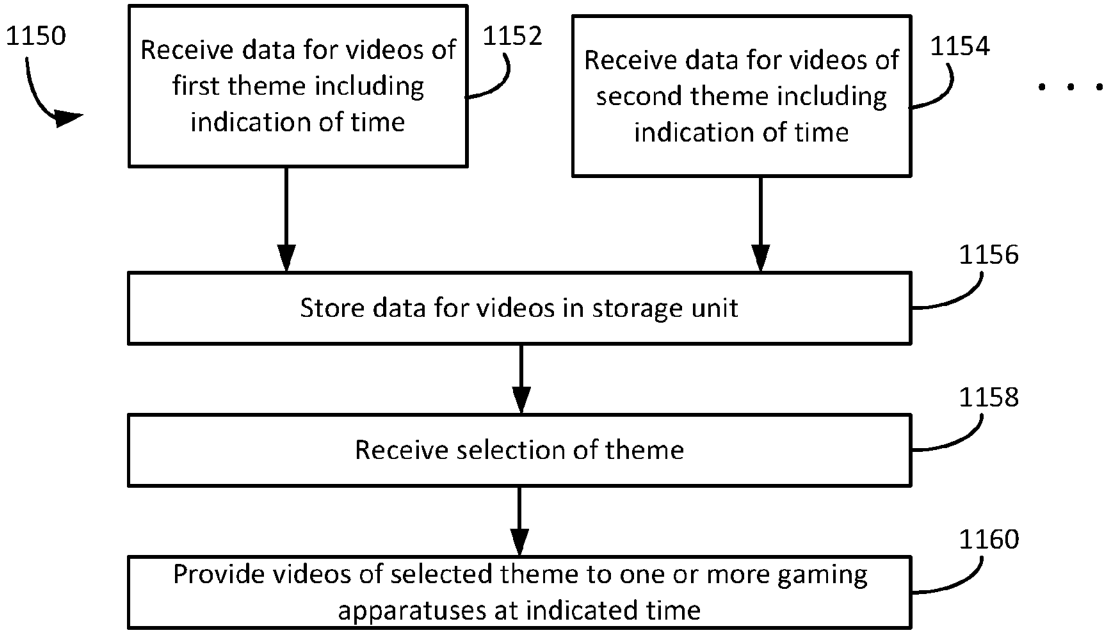
FIG. 11B is a flow chart of a process for providing videos of selected themes to one or more gaming machines according to an exemplary embodiment.

Referring to FIG. 11B, a flow diagram of a process 1150 for customizing one or more gaming apparatuses at designated times is shown, according to an exemplary embodiment. Process 1150 includes receiving data for videos of one or more themes (1152, 1154, . . . ). The data may be video data for a first set, second set, third set of videos corresponding to body portions of a plurality of actors. In various embodiments, fewer or more sets of videos may be received. The data may also include an indication of time at which the videos are to be provided to one or more gaming apparatuses. This may be the case, for example, when a casino is operating with a particular schedule of events and has themes for the gaming apparatuses for each event in the schedule. A user (e.g., operator of a casino) may be able to specify a year, month, day, time, or combination thereof to begin and end the providing of a particular theme. The user interface provided by customization system (e.g., step 1102 of FIG. 11A) may include a calendar or other interface for scheduling when one or more themes are provided. The data may also include a designation of a portion of gaming apparatuses on which to implement a particular theme. For example, in a casino with multiple, concurrent events, a user (e.g., operator of the casino) may designate a portion of gaming apparatuses on which to implement a first theme and a portion on which to implement a second theme. Process 1150 includes storing the data for the videos in a storage unit (e.g., memory 1015). The customization system may be configured to associate the received data with a particular theme and store the data for later retrieval. Process 1150 includes receiving a selection of a theme (1158). Step 1158 may be substantially similar to step 1105 (FIG. 11A). Process 1150 includes providing videos of selected theme to one or more gaming apparatuses at the indicated time (1160). According to an exemplary embodiment, the videos may be provided automatically from the customization system to the gaming apparatuses (e.g., without human intervention). The theme being provided on the gaming apparatus may automatically switch from one to another based on the videos provided by the customization system at the time designated for each theme. A user may also be able to implement a rotating system (e.g., with themes changing daily).

In other embodiments, a push-based system may be provided (instead of, e.g., a time-based or schedule-based system). An operator of the system may be able to select a theme and push the videos and other data associated with a theme to the gaming apparatuses. The user may be able to select the theme and the portion of gaming apparatuses to which to push the theme. This allows for the implementation of an ad hoc server-based theme selection system.

The gaming apparatus and/or system for customizing the gaming apparatus as shown in the various exemplary embodiments are illustrative only. Although only a few embodiments have been described in detail in this disclosure, many modifications are possible. The position of elements may be reversed or otherwise varied and the nature or number of discrete elements or positions may be altered or varied. All such modifications are intended to be included within the scope of the present disclosure. The order or sequence of any process or method steps may be varied or re-sequenced according to alternative embodiments. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Other substitutions, modifications, changes, and omissions may be made in the design, operating conditions and arrangement of the exemplary embodiments without departing from the scope of the present disclosure.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., configuration data) to a client device (e.g., for purposes of configuring the client device and/or customizing images and/or data displayed on the client device). Data generated at the client device (e.g., a result of the user interaction) can be received from the client device at the server.

What is claimed is:

1. A system for customizing at least one gaming apparatus, the at least one gaming apparatus being operated as a slot machine game, the system comprising:

a plurality of gaming apparatuses, each gaming apparatus including an electronic display, first communications electronics, and a credit input/output device;

a storage unit for storing a plurality of themes, each of the plurality of themes comprising a first set of full-motion videos associated with a first body portion of a plurality of actors, a second set of full-motion videos associated with a second body portion of the plurality of actors, and a third set of full-motion videos associated with a third body portion of the plurality of actors, wherein the first set, the second set, and the third set of full-motion videos are stored within the storage unit;

a circuit configured to receive a selection of at least one theme from the plurality of themes and including second communications electronics communicably coupled with the first communications electronics of each of the plurality of gaming apparatuses, wherein the circuit is further configured to provide the first set, the second set, and the third set of full-motion videos associated with the at least one selected theme to at least one of the plurality of gaming apparatuses;

wherein each of the plurality of gaming apparatuses is configured to cause the simultaneous display of a first full-motion video from the first set, a second full-motion video from the second set, and a third full-motion video from the third set of full-motion videos for the at least one selected theme after conducting a random or quasi-random selection from each of the first set, the second set, and the third set of full-motion videos associated with the at least one selected theme;

wherein the at least one of the plurality of gaming apparatuses enters a winning state when video including the first full-motion video corresponding to the first body portion, the second full-motion video corresponding to the second body portion, and the third full-motion video corresponding to the third body portion associated with a same actor wearing a matching set of clothing for one of the at least one selected theme is simultaneously shown on the electronic display of the at least one of the plurality of gaming apparatuses; and wherein the credit input/output device is configured to credit a user of the at least one of the plurality of gaming apparatuses in response to the at least one of the plurality of gaming apparatuses entering the winning state.

2. The system of claim 1, wherein the circuit is further configured to cause the display of a user interface for receiving the selection of one of the plurality of themes.

3. The system of claim 1, wherein the circuit is further configured to receive data corresponding to the first set, the second set, and the third set of full-motion videos, and wherein the circuit is further configured to store the data in the storage unit.

4. The system of claim 1, wherein each of the plurality of themes comprises a plurality of matching sets of clothing for the plurality of actors.

5. The system of claim 1, wherein the matching set of clothing comprises a first article of clothing corresponding to the first body portion, a second article of clothing corresponding to the second body portion, and a third article of clothing corresponding to the third body portion, and wherein each of the plurality of themes comprises variations of the first article, the second article, and the third article of clothing.

6. The system of claim 1, wherein each of the plurality of themes further comprises at least one of a background image, an action sequence in response to the winning state of the slot machine game, and audio, and wherein the circuit is further configured to cause the at least one gaming apparatus to do at least one of display the background image of the selected theme, display the action sequence of the selected theme, and play the audio of the selected theme.

7. The system of claim 1, wherein each of the plurality of themes further comprises an information sequence in response to the winning state of the slot machine game, the information sequence comprising at least one of a video, an image, and text, and wherein the circuit is further configured to cause the at least one gaming apparatus to display at least one of the video, the image, and the text of the selected theme.

8. The system of claim 1, wherein each of the plurality of themes further comprises an indication of time when the at least one gaming apparatus will display the first set, the second set, and the third set of full-motion videos for the selected theme, and wherein the circuit is configured to automatically cause the at least one gaming apparatus to display the first set, the second set, and the third set of full-motion videos for the selected theme at the indicated time.

9. The system of claim 1, wherein the circuit is further configured to provide the first set, the second set, and the third set of full-motion videos for the at least one selected theme to the plurality of gaming apparatuses.

10. The system of claim 1, wherein the storage unit further comprises at least one of text and audio corresponding to a plurality of languages, and wherein the circuit is further configured to:

receive a selection of a language from the plurality of languages; and cause the at least one gaming apparatus to do at least one of display the text corresponding to the associated language and play the audio corresponding to the selected language.

11. A computerized method of customizing at least one gaming apparatus, the at least one gaming apparatus being operated as a slot machine game, the method comprising:

communicably coupling first communications electronics of the at least one gaming apparatus to second communications electronics of a processing circuit;

receiving, at the processing circuit, a selection of at least one theme from a plurality of themes, each of the plurality of themes comprising a first set of full-motion videos associated with a first body portion of a plurality of actors, a second set of full-motion videos associated with a second body portion of the plurality of actors, and a third set of full-motion videos associated with a third body portion of the plurality of actors, wherein the first set, the second set, and the third set of full-motion videos are stored within a storage unit; and conducting, by at least one of the processing circuit and the at least one gaming apparatus, a random or quasi-random selection from each of the first set, the second set, and the third set of full-motion videos associated with the at least one selected theme;

causing an electronic display of the at least one gaming apparatus to simultaneously display a first full-motion video from the first set, a second full-motion video from the second set, and a third full-motion video from the third set of full-motion videos for the at least one selected theme;

wherein the at least one gaming apparatus enters a winning state when video including the first full-motion video corresponding to the first body portion, the second full-motion video corresponding to the second body portion, and the third full-motion video corresponding to the third body portion associated with a same actor wearing a matching set of clothing for one of the at least one selected theme is simultaneously shown on the electronic display of the at one least gaming apparatus; and wherein a credit input/output device of the at least one gaming apparatus is configured to credit a user of the at least one gaming apparatus in response to the at least one gaming apparatus entering the winning state.

12. The method of claim 11, further comprising:

causing an electronic display to display a user interface for receiving the selection of one of the plurality of themes.

13. The method of claim 11, further comprising:

receiving data associated with the first set, the second set, and the third set of full-motion videos; and storing the data in the storage unit.

14. The method of claim 11, wherein each of the plurality of themes comprises a plurality of matching sets of clothing for the plurality of actors.

15. The method of claim 11, wherein the matching set of clothing comprises a first article of clothing corresponding to the first body portion, a second article of clothing corresponding to the second body portion, and a third article of clothing corresponding to the third body portion, and wherein each of the plurality of themes comprises variations of the first article, the second article, and the third article of clothing.

16. The method of claim 11, wherein each of the plurality of themes further comprises at least one of a background image, an action sequence in response to the winning state of the slot machine game, and audio, and further comprising:

causing the at least one gaming apparatus to do at least one of display the background image of the selected theme, display the action sequence of the selected theme, and play the audio of the selected theme.

17. The method of claim 11, wherein each of the plurality of themes further comprises an information sequence in response to the winning state of the slot machine game, the information sequence comprising at least one of a video, an image, and text, and further comprising:

causing the at least one gaming apparatus to display at least one of the video, the image, and the text of the selected theme.

18. The method of claim 11, wherein each of the plurality of themes further comprises an indication of time when the at least one gaming apparatus will display the first set, the second set, and the third set of full-motion videos for the selected theme, and further comprising:

automatically causing the at least one gaming apparatus to display the first set, the second set, and the third set of full-motion videos for the selected theme at the indicated time.

19. The method of claim 11, further comprising:

providing the first set, the second set, and the third set of full-motion videos for the selected theme to the at least one gaming apparatus.

20. The method of claim 11, further comprising:

receiving a selection of a language from a plurality of languages; and causing the at least one gaming apparatus to do at least one of display text corresponding to the associated language and play audio corresponding to the selected language.

* * * * *